(12) United States Patent
Merry

(10) Patent No.: US 8,231,836 B2
(45) Date of Patent: *Jul. 31, 2012

(54) POLLUTION CONTROL DEVICE AND INORGANIC FIBER SHEET MATERIAL WITH A FUSED EDGE

(75) Inventor: Richard P. Merry, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/365,873

(22) Filed: Feb. 3, 2012

(65) Prior Publication Data

US 2012/0135205 A1 May 31, 2012

Related U.S. Application Data

(63) Continuation of application No. 11/719,500, filed as application No. PCT/US2005/038429 on Oct. 25, 2005, now Pat. No. 8,133,443.

(60) Provisional application No. 60/629,212, filed on Nov. 18, 2004.

(51) Int. Cl.
B01D 50/00 (2006.01)
B32B 5/12 (2006.01)

(52) U.S. Cl. ........................................ 422/179; 428/113

(58) Field of Classification Search .................. 422/179, 422/180; 428/113, 193
See application file for complete search history.

(56) References Cited

U.S. PATENT DOCUMENTS

| 4,929,429 | A | 5/1990 | Merry |
| 5,250,269 | A | 10/1993 | Langer |
| 5,290,522 | A | 3/1994 | Rogers et al. |
| 5,380,580 | A | 1/1995 | Rogers et al. |
| 5,882,608 | A | 3/1999 | Sanocki et al. |
| 6,245,301 | B1 | 6/2001 | Stroom et al. |
| 2004/0057879 | A1 | 3/2004 | Aizawa et al. |
| 2007/0028744 | A1 | 2/2007 | Osumi |
| 2007/0065349 | A1 | 3/2007 | Merry |
| 2009/0081455 | A1 | 3/2009 | Mitani |

FOREIGN PATENT DOCUMENTS

| EP | 0 639 702 A1 | 2/1995 |
| JP | 2-289442 | 11/1990 |
| WO | WO 03/031368 A2 | 4/2003 |

Primary Examiner — Tom Duong

(57) ABSTRACT

Inorganic fiber mounting and insulating sheet materials for use in pollution control devices with at least one edge of the inorganic fiber sheet material having at least one group of two or more fibers fused together. A pollution control device comprising such a sheet material. A process for cutting at least one section from a sheet containing inorganic fiber material, where the sheet material is suitable for use in a pollution control device. The fibrous sheet material is cut so that the cut edge has at least one group of two or more fibers fused together. A laser beam can be used to cut the desired section out of the inorganic fiber sheet material.

16 Claims, 5 Drawing Sheets

POLLUTION CONTROL DEVICE AND INORGANIC FIBER SHEET MATERIAL WITH A FUSED EDGE

CROSS REFERENCE TO RELATED APPLICATIONS

This application is a continuation of U.S. Ser. No. 11/719,500, filed Apr. 23, 2009, now U.S. Pat. No. 8,133,443 which is a national stage filing under 35 U.S.C. 371 of PCT/US2005/038429, filed Oct. 25, 2005, which claims priority to U.S. Application No. 60/629,212 filed Nov. 18, 2004, the disclosures of which are incorporated by reference in their entireties herein.

FIELD OF THE INVENTION

The present invention relates to pollution control devices, in particular, to inorganic fiber mounting and insulating sheet materials used in such devices, and more particularly, to such mounting and insulating sheet materials with at least one edge of the inorganic fiber sheet material having at least one group of two or more fibers fused together. The present invention also relates to a pollution control device comprising such a sheet material, as well as a process for making such sheet materials.

BACKGROUND OF THE INVENTION

Pollution control devices are employed on motor vehicles to control atmospheric pollution. Such devices include catalytic converters and diesel particulate filters or traps. These devices include a pollution control element. For example, catalytic converters typically contain a ceramic or metal monolithic structure that supports the catalyst. The catalyst oxidizes carbon monoxide and hydrocarbons, and reduces the oxides of nitrogen in engine exhaust gases to control atmospheric pollution. In addition, diesel particulate filters or traps typically contain a wall flow filter in the form of a honeycombed monolithic structure, usually made from porous crystalline ceramic materials. Each of these devices has a metal housing (typically stainless steel) which holds or mounts the pollution control element.

Such pollution control elements are typically fragile and susceptible to vibration or shock damage and breakage. The damaging forces may come from rough handling or dropping during engine assembly, from engine vibration or from travel over rough roads. Such pollution control elements are also typically subject to damage due to high thermal shock, such as from contact with road spray. To protect the pollution control element, especially the ceramic monolithic type, and to prevent exhaust gases from passing between the pollution control element and the surrounding housing (thereby bypassing the catalyst or filter), mounting mats are disposed between the pollution control element and the housing.

Some mounting mats and insulating elements (e.g., end cone insulation) include mostly inorganic fibers, with inorganic or organic binders, fillers and the like. Such mounting mats are commonly die cut, using metal blades, out of larger sheets of the inorganic fiber material.

The present invention provides an improvement to such prior mounting mats and insulating elements.

SUMMARY OF THE INVENTION

It has been found that using a cutting blade or other such device to mechanically cut out mounting mats or insulation elements (e.g., end cone insulation) from inorganic fiber containing sheet materials results in the inorganic fibers being fractured/broken rather than actually cut. Because the fibers fracture, a substantial amount of fiber dust results from the mechanical cutting operation. The generation of dust from binder and/or filler materials may also result as well. Such dust remains in the separated mats and insulation. Later, when the section of sheet material (e.g., mounting mat or end cone insulation) are incorporated into the pollution control device, dust escapes from the sheet material and can cause itching/skin irritation problems for the workers handling these materials. The present invention is directed to reducing the amount of dust that escapes from such inorganic fiber sheet materials (e.g., a mounting mat, end cone insulation), especially while being handled during a pollution control device assembly operation.

In accordance with the present invention, a mat is provided for mounting a pollution control element in a pollution control device, wherein the mat may be cut from a sheet of inorganic fiber material via a laser beam. The inorganic fiber material sheet may be non-woven. The laser beam causes groups of two or more fibers at each cut edge to fuse together. It further causes cut ends of at least a portion of the fibers that do not fuse with other fibers to have enlarged or mushroom-shaped ends. The fused fiber groups and mushroom-shaped fiber ends function to at least partially seal the cut edge(s) of the mounting mat. Hence, a reduced amount of entrapped dust leaves the mounting mat while being handled during a subsequent pollution control device assembly operation. Consequently, it is believed that workers handling such mats will have reduced itching/skin irritation problems.

In one aspect of the present invention, a pollution control device is provided comprising: a housing; a pollution control element disposed in the housing; and a mounting mat disposed in a gap between at least a portion of the housing and a portion of the pollution control element. The mounting mat is defined by an inorganic fiber material section having at least one edge with at least one group of two or more fibers fused together.

In another aspect of the present invention, a mat is provided for mounting a pollution control element comprising an inorganic fiber material section having at least one edge with at least one group of two or more fibers fused together.

In accordance with an additional aspect of the present invention, a process is provided for cutting from a sheet of inorganic fiber material at least one section of fiber material suitable for use in a pollution control device. The process comprises: providing a laser apparatus; providing a sheet of inorganic fiber material; operating the laser apparatus so as to generate a laser beam; and applying the laser beam to the inorganic fiber material sheet so as to cut from the sheet at least one section of fiber material suitable for use in a pollution control device.

DETAILED DESCRIPTION OF THE INVENTION

Figure 1:
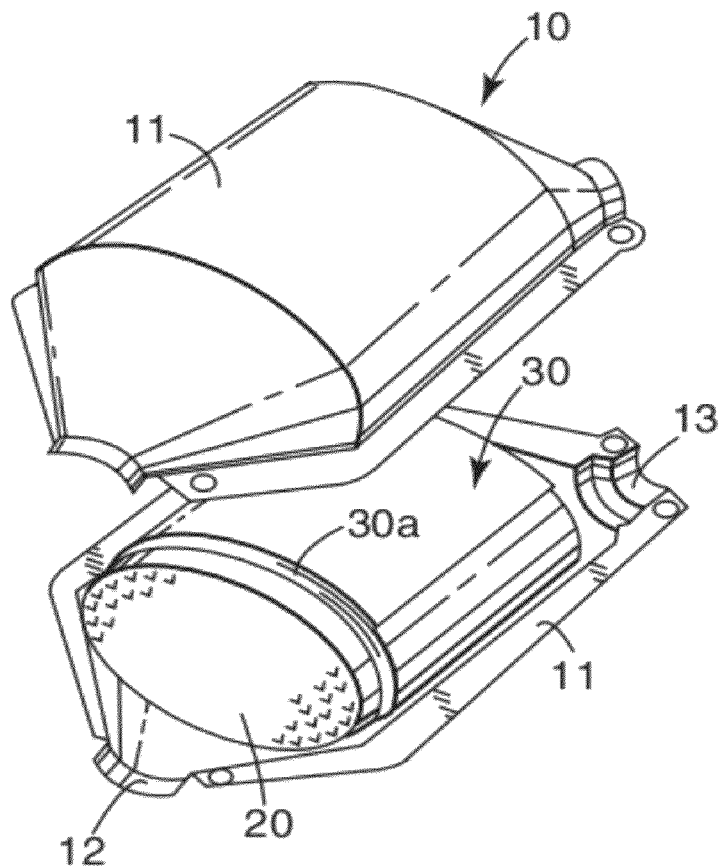
FIG. 1 is a perspective view of a catalytic converter including a mat cut in accordance with the present invention and shown in a disassembled relation.
Figure 2:
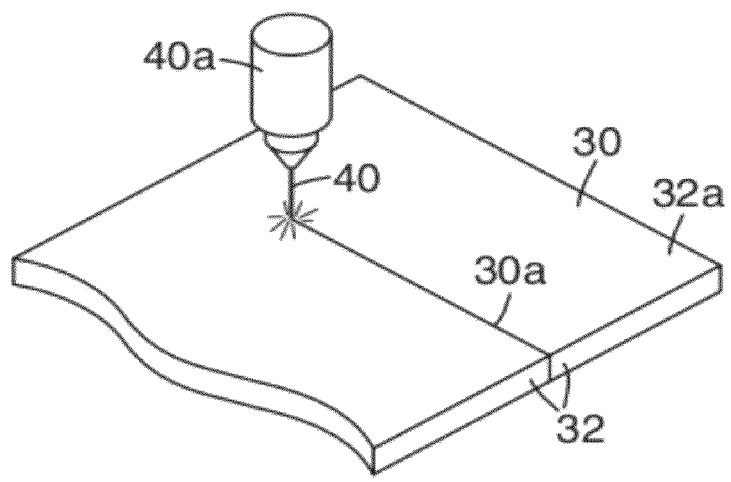
FIG. 2 is a schematic illustration of a laser beam generating apparatus used in accordance with the present invention to cut a sheet of fiber material so as to separate from the sheet one or more pollution control element mounting mats.

In accordance with the present invention, a mounting mat 30 is provided for use in a pollution control device 10, see FIG. 1, wherein the mounting mat 30 is cut from a sheet of fiber material 32 via a laser beam 40, see FIG. 2. In contrast to a mechanical blade cutting operation, which effects fiber cutting by fracturing the fibers, a laser beam cutting operation severs fibers via a melting process. As a result, less fiber dust results during a laser beam cutting operation as compared with a mechanical blade cutting operation. As will be discussed more fully below, the laser beam 40 also causes groups of two or more fibers in each cut edge 30a of the mat 30 to fuse together. It further causes cut ends of at least a portion of the fibers that do not fuse with other fibers to have enlarged or mushroom-shaped ends. The fused fiber groups and mushroom-shaped fiber ends function to at least partially seal each cut edge 30a of the mounting mat 30. Hence, a reduced amount of entrapped dust leaves the mounting mat 30 while being handled during a subsequent pollution control device assembly operation. Consequently, it is believed that workers handling such mat materials will have reduced itching/skin irritation problems.

An illustrative example of a pollution control device in which the mat 30 of the present invention may be incorporated is shown in FIG. 1 and comprises a catalytic converter 10. The catalytic converter 10 includes a housing 11 surrounding a catalytic converter element 20, which defines the pollution control element in the control device. The housing 11 has an inlet 12 and an outlet 13 through which exhaust gases flow into and out of the catalytic converter 10. The housing 11, which is also referred to as a can or a casing, can be made from suitable materials known in the art. For example, the housing 11 can be made from a stainless steel.

Suitable catalytic converter elements 20, also referred to as monoliths, are known in the art and include those made of metal, ceramic, or other materials. One or more catalyst materials can be coated onto the catalytic converter element 20 in accordance with conventional practices.

To provide a large amount of surface area, catalytic converter elements generally have very thin walls. The thin walls can cause the catalytic converter element 20 to be fragile and susceptible to breakage. Additionally, in some embodiments, the catalytic converter element 20 can have a coefficient of thermal expansion about an order of magnitude less than that of housing 11. This is particularly the case when the housing 11 is formed of a metal (usually stainless steel) and element 20 is a ceramic. The difference in thermal properties can subject the catalytic converter element 20 to risk of damage with changes in temperature. Mounting mat 30, disposed between housing 11 and element 20, helps protect the element 20 from damage due to road shock and vibration and/or the thermal expansion difference. Mounting mat 30 also helps prevent exhaust gases from passing between the element 20 and the metal housing 11.

The sheet of fiber material 32 from which one or more mounting mats 30 are cut may comprise between about 85 percent and 100 percent by weight inorganic fibers, based on the total weight of the material 32, and between about 0 percent to about 15 percent by weight binder material, based on the total weight of the material 32. The inorganic fiber material sheet 32 may be non-woven. The fibers may be selected from the group consisting of polycrystalline fibers, ceramic fibers, silica fibers, biosoluble fibers, glass fibers and blends thereof. The fibers may have a length of from about 2 mm to about 150 mm. A binder material, if provided, may be selected from the group consisting of organic binders, inorganic binders, and mixtures thereof. Suitable organic binder materials include aqueous polymer emulsions, solvent based polymer solutions, and polymers or polymer resins (100% solids). Aqueous polymer emulsions are organic binder polymers and elastomers in the latex form, for example, natural rubber lattices, styrene-butadiene lattices, butadiene-acrylonitrile lattices, ethylene vinyl acetate lattices, and lattices of acrylate and methacrylate polymers and copolymers. Polymer and polymer resins include natural rubber, styrene-butadiene rubber, and other elastomeric polymer resins. Acrylic latex and polyvinyl acetate organic binders may be preferred. Inorganic binders may include clay materials such as bentonite, colloidal silicas and mixtures thereof. The binder may be sprayed onto the outer surfaces of the fiber material 32 or may be incorporated throughout the thickness of the fiber material 32.

It is also contemplated that the fiber material 32 may be stitchbonded or needle-punched. Stitchbonded or needle-punched mats 30 may be with or without a binder.

The fiber material 32 may have a thickness of between about 2 mm and 25 mm and a weight/area of between about 200 g/m$^2$ to about 4000 g/m$^2$. Examples of inorganic fiber mounting mat material capable of being cut via a laser beam are disclosed in U.S. Pat. Nos. 4,929,429, 5,250,269, 5,290,522, and 5,380,580, Published U.S. Patent Application U.S. 2004/0057879 and International Publication No. WO 03/031368 A2, the disclosures of which are incorporated by reference herein. It is preferred that fiber material 32 include little or no intumescent material.

A conventional laser beam generating apparatus 40a, see FIG. 2, may be used to generate the laser beam 40 for effecting fiber material cutting. One such apparatus is a "Preco Eagle 500," which is commercially available from Preco Laser Systems, LLC, located in Somerset, Wis. The fiber material 32 may be cut at a rate of between about 254 cm/minute to about 1270 cm/minute. For example, a mat having a thickness of about 7.5 mm may be cut at a rate of from about 508 cm/minute to about 635 cm/minute. The laser beam generating apparatus may be operated so as to generate a laser beam at a power level, i.e., beam output power level, of between about 270 W to about 500 W. As will be apparent to those skilled in the art, the cut rate and power level will vary with fiber material make-up, weight/area and thickness.

Example

Figure 3A:
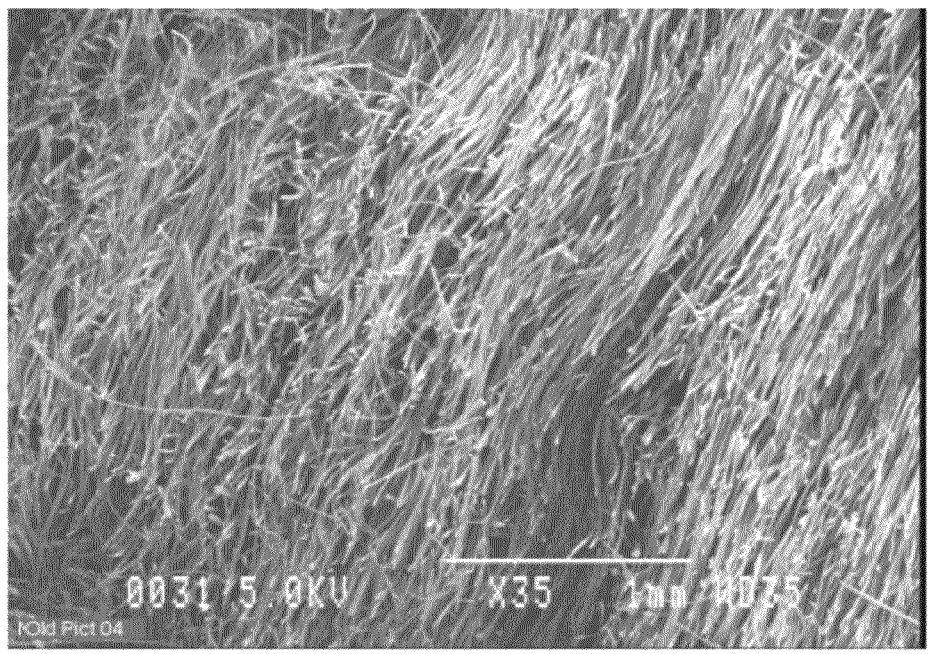
FIGS. 3A-3C are photomicrographs taken at magnification levels of ×35; ×70 and ×100, respectively, showing an edge of a blade cut fiber material.
Figure 3B:
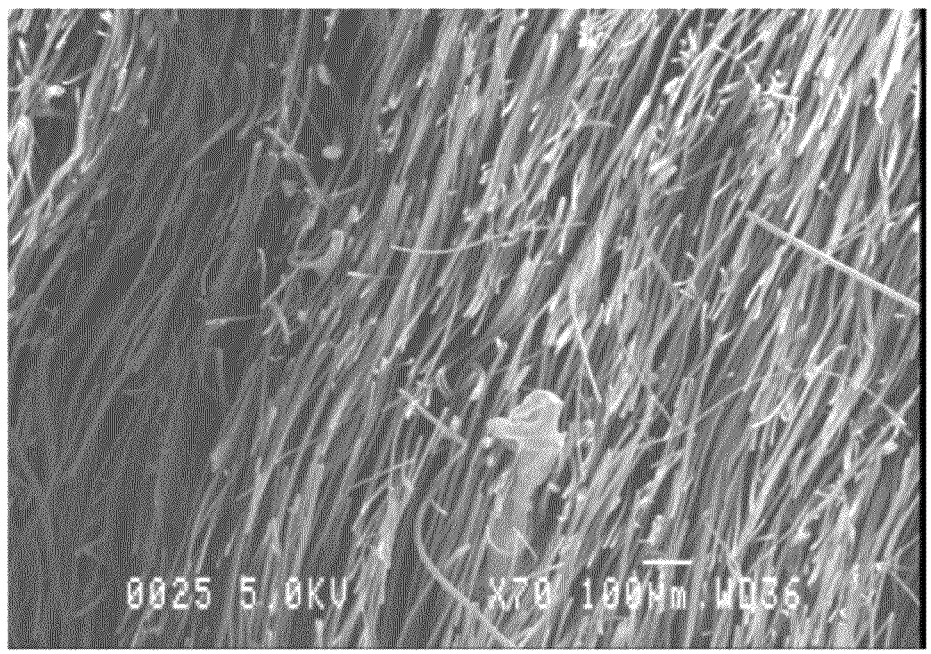
Figure 3C:
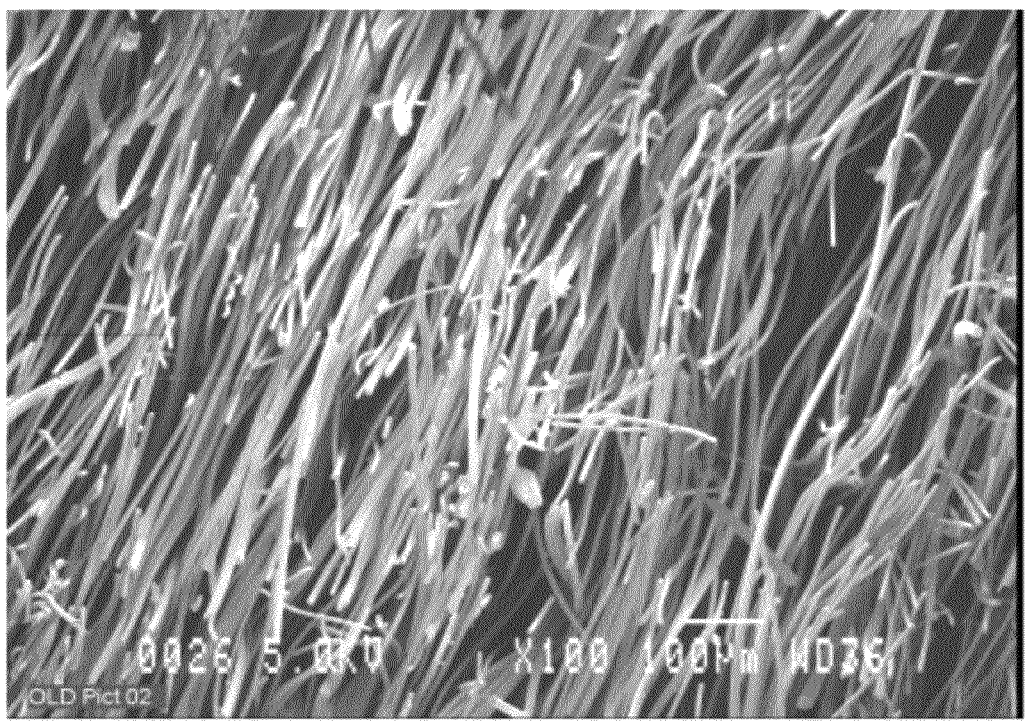
Figure 4A:
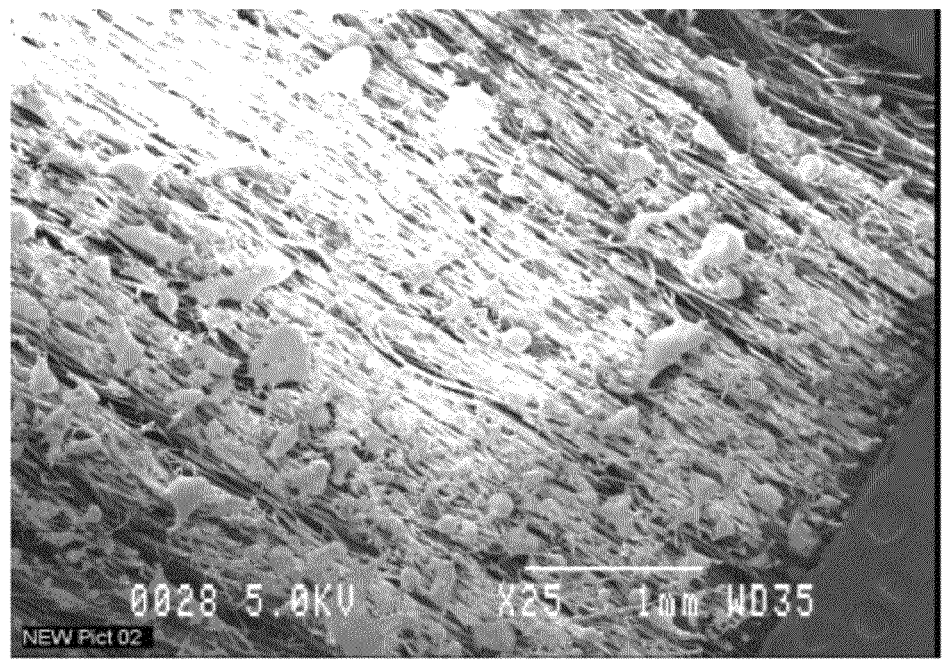
FIGS. 4A-4D are photomicrographs taken at magnification levels of ×25; ×100; ×100; and ×450, respectively, showing an edge of a laser beam cut fiber material.
Figure 4B:
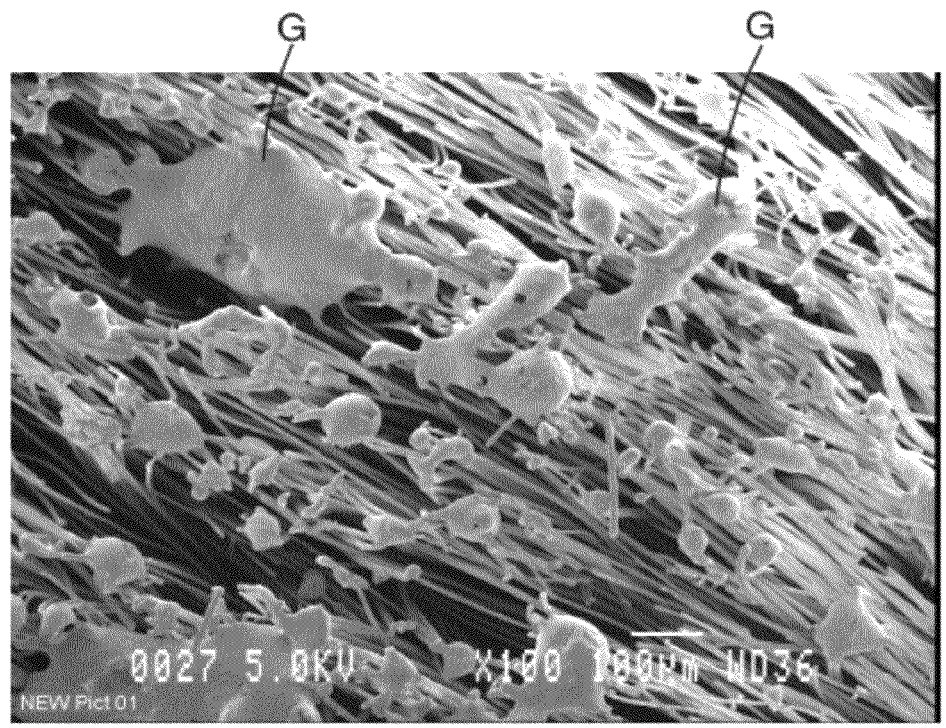
Figure 4C:
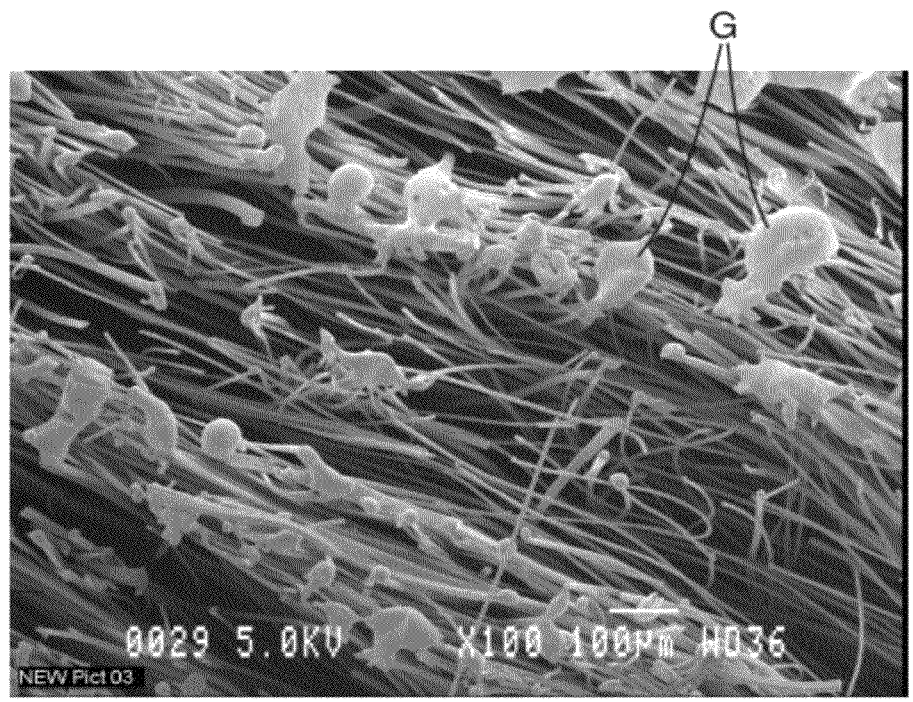
Figure 4D:
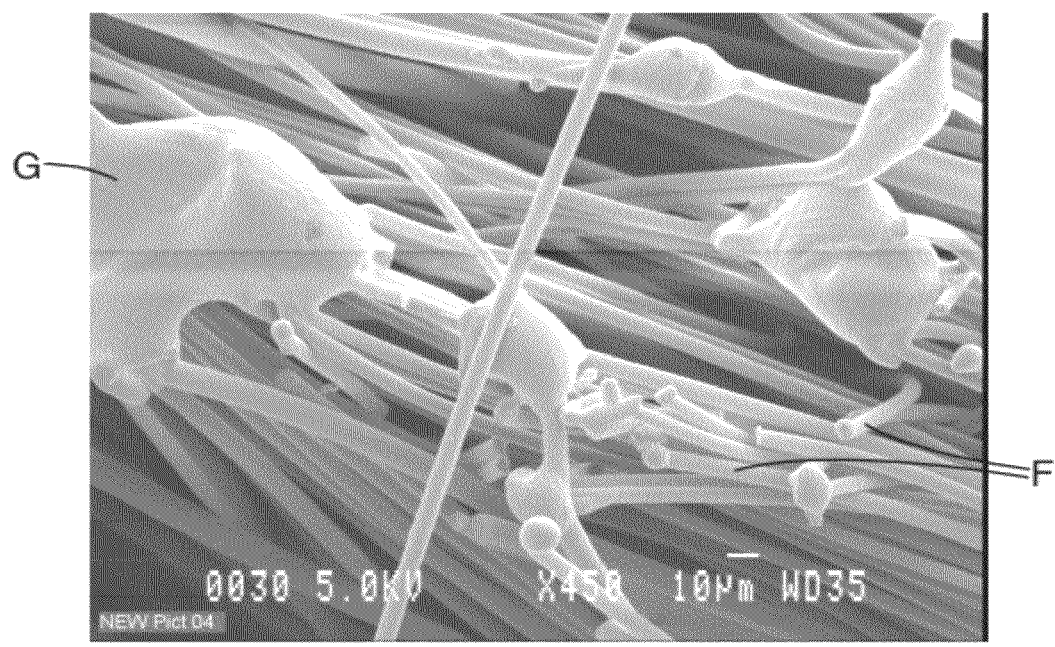

A sheet of fiber material comprising a 3M™ Interam™ Non-Intumescent Mat Mount Series 1500 HT was cut using the Preco Eagle 500 laser beam generating apparatus 40a, noted above. The fiber material comprised about 99% by weight polycrystalline ceramic fibers, and 1% by weight organic binder, had a thickness of about 7.5 mm inch and a weight/area of about 1230 g/m$^2$. The organic binder comprised a dried acrylic latex outer coating, i.e., a binder sprayed onto each major outer surface. A mechanical blade was used to cut a section from the sheet of fiber material during a first cutting operation. FIGS. 3A-3C are photomicrographs showing an edge of the blade cut fiber material section taken at magnification levels of ×35; ×70; and ×100, respectively.

A laser beam generated using the Preco Eagle 500 laser beam generating apparatus 40a, noted above, was used to cut other sections from the sheet of fiber material during second and third cutting operations. During the second cutting operation, the fiber material was cut at a rate of about 508 cm/minute at a power level of about 270 W. During the third cutting operation, the fiber material was cut at a rate of about 635 cm/minute at a power level of about 500 W. FIGS. 4A-4D are photomicrographs showing an edge of the fiber material section cut by the laser beam during the second cutting operation taken at magnification levels of ×25; ×100; ×100; and ×450, respectively.

As can be seen in FIGS. 4A-4D, the laser cut edge of the fiber material section comprised a plurality of groups G of two or more fibers fused together as a result of the laser beam cutting operation. The laser cut edge of the fiber material section further comprised a plurality of fibers F not fused with other fibers and having mushroom-shaped ends. The fused fiber groups and mushroom-shaped fiber ends function to at least partially seal the cut edge(s) of the laser cut fiber material section so as to reduce the amount of dust leaving the fiber material section during subsequent handling.

Fiber Loss Test

A fiber loss test was conducted on samples taken from the sections of the sheet of fiber material cut during the first and second cutting operations. In particular, six samples were taken from the section of the sheet of fiber material cut via the blade during the first cutting operation. Six additional samples were taken from that same section of the fiber material sheet, which samples were vacuumed lightly along their cut edges to remove loose fibers prior to being tested. Six samples were taken from the section of the sheet of fiber material cut via the laser beam during the second cutting operation.

The fiber loss test is used to determine the amount, by weight, of fiber that is lost by a ceramic fiber material on impact. The test fixture has a fixed vertical frame connected by hinges at the top to a second frame having approximately the same dimensions as the fixed frame. The second frame can be moved outwardly at the bottom to form an angle at the top that is defined by the fixed frame and the second frame. A test sample of fiber material measuring 100 mm by 100 mm is weighed, and then clamped onto a mounting plate attached to the bottom of the second frame. The mounting plate is even with the bottom of the second frame so the mat and plate do not extend beyond the peripheral edges of second frame. To perform the test, the second frame is raised to form a 30 degree angle with the fixed frame and released so that it strikes the fixed frame. The impact of the plate striking the frame causes any loosely held fibers to fall off of the sample. The sample is removed and weighed, and test results are reported in percent weight loss as follows:

[(Tared weight−Weight after striking frame)/(Tared weight)]×100=Percent Fiber Loss wherein "tared weight" is the weight of the sample prior to being clamped onto the mounting plate of the second frame.

The six samples taken from the section of the sheet of fiber material cut via the blade during the first cutting operation, and without having their cut edges vacuumed, had an average percent weight loss of about 0.074%. The six additional samples having their blade cut edges vacuumed had an average percent weight loss of about 0.067%. The six samples taken from the section of the sheet of fiber material cut via the laser beam during the second cutting operation had an average percent weight loss of 0.040%. Hence, the laser cut samples had much less dust loss as compared to the mechanical blade cut samples, including those having their cut edges vacuumed. Based on this data, it is believed that laser cut mounting mats will have a lower amount of dust loss when handled during a pollution control device assembly operation as compared to blade cut mounting mats.

Accelerated Cold Erosion Test

An accelerated cold erosion test was conducted on samples taken from the sections of the sheet of fiber material cut during the first, second and third cutting operations.

The cold erosion test is an accelerated test conducted under conditions that are more severe than typical actual conditions in a catalytic converter. It provides comparative data as to the erosion resistance of a fiber mat mounting material. A test sample, approximately 2.54 cm by 2.54 cm., is measured, weighed, and mounted between two high temperature Inconel 601 steel plates using spacers to form a test assembly. The mount density for testing the samples in the example is 0.28+/−0.005 g/cc. The test assembly is heated for one hour at 800° C. and cooled to room temperature. The cooled test assembly is then positioned 3.8 mm in front of an air jet that oscillates back and forth over an exposed edge of the mat at 20 cycles per minute. The air jet impinges on the edge of the mat at a velocity of 305 meters per second. This test is discontinued after 0.2 grams of material is lost, as estimated by a technician based on his/her observation of the material loss, or after 24 hours, whichever occurs first. The erosion rate is determined by the weight loss divided by the time of the test and is reported in grams/hour (g/hr).

Three samples taken from each fiber material section cut during the first, second and third cutting operations were evaluated for cold erosion. The fiber material sections were disk shaped, each having a 104.8 mm diameter. The samples were cut from the disc sections such that an arc-shaped cut edge, i.e., blade or laser cut edge, of each sample was the edge exposed to the air impingement. The average erosion rate of the blade cut samples was 0.0008 g/hr. The average erosion rate of the samples laser cut during the second cutting operation was 0.0003 g/hr, and for the samples laser cut during the third cutting operation was 0.0001 g/hr. Hence, the laser cut samples had much less fiber loss/hour as compared to the mechanical blade cut samples.

It is contemplated that one or more edges of a mat cut or otherwise separated from a sheet of inorganic fiber material, and which may not be cut by a laser beam, may have one or more edges exposed to the heat of an oven or exposed to a flame, such as from a torch, so as to fuse together one or more groups of two or more fibers as well as form mushroom-shaped ends on a plurality of fibers not fused with other fibers so as to at least partially seal the edge(s) of the mat. The sheet of inorganic fiber material may comprise material which is the same or similar to the sheet of fiber material 32 described above and from which the mounting mats 30 are cut.

It is also contemplated that an end-cone insulation mat adapted to be disposed in a gap between inner and outer end-cone sections of a pollution control device housing may comprise an inorganic fiber material section having at least one laser cut edge or heat exposed edge. Such a section may be cut from a sheet of inorganic fiber material via a laser beam in the same manner that a pollution control element mounting mat is cut from a sheet of inorganic fiber material. The inorganic fiber material may comprise material which is the same or similar to the sheet of fiber material 32 described above and from which the mounting mats 30 are cut. However, the shape of the laser cut end-cone insulation mat may be different from that of a mounting mat so as to allow the insulation mat to be formed into the shape of the gap, e.g., cone-like, between the inner and outer end-cone sections of the pollution control device housing.

It is still further contemplated that a fire barrier mat may be defined by an inorganic fiber material section having at least one laser cut edge or heat exposed edge. The inorganic fiber material may comprise material which is the same or similar to the sheet of fiber material 32 described above and from which the mounting mats 30 are cut. Such a fire barrier mat may be cut from a sheet of inorganic fiber material via a laser beam in the same manner that a pollution control element mounting mat is cut from a sheet of inorganic fiber material. Laser cut fire barrier mats may be wrapped about pipes, conduits so as to insulate the pipes, conduits from heat and fire.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mat comprising an inorganic fiber material section having opposite major outer surfaces and at least one edge, with only said at least one edge having fibers either fused together so as to reduce the erosion rate of said at least one edge, fused together so as to at least partially seal said mat so as to reduce the amount of entrapped dust leaving said mat when handled or both.

2. The mat as set forth in claim 1, wherein said at least one edge is exposed to heat so as to fuse said fibers together.

3. The mat as set forth in claim 1, wherein said at least one edge is a laser cut edge.

4. The mat as set forth in claim 1, wherein said fiber material section edge further comprises fibers not fused with other fibers and having mushroom-shaped ends.

5. The mat as set forth in claim 1, wherein said fiber material section comprises fibers selected from the group consisting of polycrystalline fibers, ceramic fibers, silica fibers, biosoluble fibers, glass fibers and blends thereof.

6. The mat as set forth in claim 1, wherein said fiber material section comprises a binder material selected from the group consisting of organic binders, inorganic binders, and mixtures thereof.

7. The mat as set forth in claim 1, wherein said fiber material section comprises at least about 85 percent by weight fibers, based on the total weight of said fiber material section, and up to about 15 percent by weight binder material, based on the total weight of said fiber material section.

8. The mat as set forth in claim 1, wherein said inorganic fiber material section comprises a non-woven inorganic fiber material section.

9. A process for cutting from a sheet of inorganic fiber material at least one section of fiber material, said process comprising:
    providing a laser apparatus;
    providing a sheet of inorganic fiber material suitable for use in a pollution control device;
    operating the laser apparatus so as to generate a laser beam; and
    applying the laser beam to the inorganic fiber material sheet so as to cut from the sheet at least one section of fiber material in the form of a mat as set forth in claim 1, with the section of fiber material having at least one cut edge with at least one group of two or more fibers fused together by the laser beam.

10. The process as set forth in claim 9, wherein the laser beam is applied to the fiber material so as to cut the material at a rate of between about 508 cm/minute to about 635 cm/minute.

11. The process as set forth in claim 10, wherein the laser beam is operated at a power level of between about 270 W to about 500 W.

12. The process as set forth in claim 11, wherein the fiber material has a thickness of from about 2 mm to about 25 mm.

13. The process as set forth in claim 9, wherein the laser beam is applied to the fiber material so as to cut the material at a rate of between about 254 cm/minute to about 1270 cm/minute.

14. The process as set forth in claim 9, wherein the fiber material comprises at least about 85 percent by weight fibers, based on the total weight of the fiber material, and up to about 15 percent by weight binder material, based on the total weight of the fiber material.

15. The process as set forth in claim 14, wherein the fiber material section comprises fibers selected from the group consisting of polycrystalline fibers, ceramic fibers, silica fibers, biosoluble fibers, glass fibers and blends thereof.

16. The process as set forth in claim 9, wherein the sheet of inorganic fiber material comprises a non-woven sheet of inorganic fiber material.

* * * * *